Feb. 12, 1963     J. O. BENSON     3,077,406
METHOD OF MAKING STAR-SHAPED CEREAL
Filed Sept. 8, 1959

*INVENTOR.*
JOHN O. BENSON
BY Anthony A. Juettner
ATTORNEY

United States Patent Office 3,077,406
Patented Feb. 12, 1963

3,077,406
METHOD OF MAKING STAR-SHAPED CEREAL
John O. Benson, Mayer, Minn., assignor to General Mills,
Inc., a corporation of Delaware
Filed Sept. 8, 1959, Ser. No. 838,608
6 Claims. (Cl. 99—81)

The present invention relates generally to an attractively shaped cereal product of the ready-to-eat variety and more specifically to a process for producing a star-shaped cereal product.

In manufacturing cereal products, particularly those of the ready-to-eat variety such as breakfast foods, snacks and the like, it has been found that if the cereal product possesses an easily recognizable shape or configuration, it generally has an important bearing upon the commercial success of the product.

In the past, cereal products have been produced in a wide variety of shapes such as spheres, pillow-shaped rectangles and letters of the alphabet. Numerous shapes, however, defy economical reproduction in the form of ready-of-eat cereal products. A particularly desirable shape for instance which has been difficult to reproduce is that of the star.

For example, when cereal dough is extruded through a star-shaped die and sliced, a distorted ball-shaped pellet is obtained. Such pellets are still further distorted when subjected to a puffing process and a final product is produced which bears little resemblance to a star.

While a star-shaped product can be obtained by rolling dough into thin sheets, cutting the sheets into star shapes, separating said star-shaped dough products and toasting, such a method presents obvious economic disadvantages such as the waste of dough materials and need for relatively expensive rolling, cutting and separating machinery.

It is therefore an object of the present invention to provide a highly effective and efficient method of producing a cereal product having a well defined star shape.

Briefly stated, I have discovered a novel method of preparing a star-shaped cereal product which comprises producing an extrudable cereal dough, extruding said dough into a strand having a central portion with connecting radially extending arms of substantially uniform width throughout, controlling the extrusion of said central portion by maintaining said central portion of the strand at the point of formation of said strand in the form of an annulus having a transverse dimension approximately equal to the width of said arms, slicing the thus shaped strand into thin wafers, and then puffing said wafers by conventional methods to form a star-shaped cereal product.

Other objects and advantages of my present invention will become apparent from the following specification and the appended drawings in which.

Figure 1:
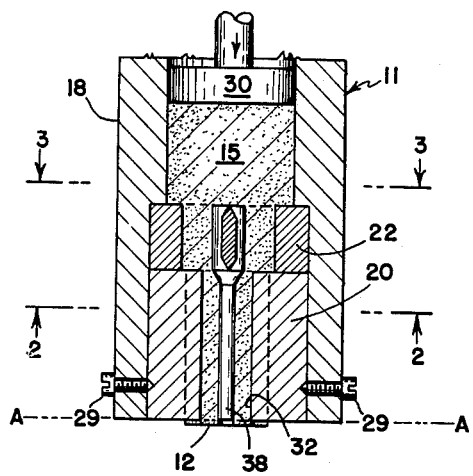
FIGURE 1 is an elevational view in section of an extrusion apparatus for producing the cereal product of the invention.
Figure 2:
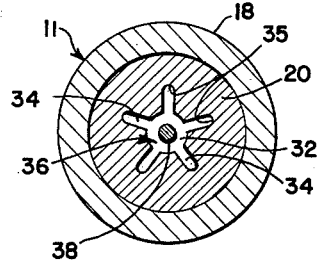
FIGURE 2 is a sectional view taken generally in the direction of and along line 2—2 of FIGURE 1, illustrating the die employed in the extrusion apparatus.
Figure 3:
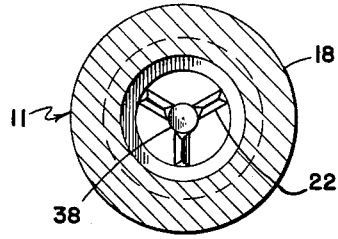
FIGURE 3 is a sectional view taken generally in the direction of and along line 3—3 of FIGURE 1, illustrating the dough directing element located immediately above the orifice plate.

Describing first an apparatus with which the invention may be practiced, reference should be had to FIGURES 1, 2 and 3 of the drawing where the extrusion apparatus designated generally by the reference number 11 includes a cylindrical shell or casing 18 which provides a housing for an orifice plate 20 and a dough flow controlling member 22.

In FIGURE 2, the orifice plate 20 is seen to have a cylindrical opening 32 which has projecting radially outward therefrom, openings 34 through which the dough passes when extruded. The openings 34 are equal in width throughout their entire length and terminate in rounded ends 35. It can thus be seen that the opening in the die which is indicated generally by the numeral 36 is substantially identical to the pellet 10 of FIGURE 5, except for the hole or opening 16.

Figure 5:
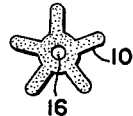
FIGURE 5 is a plan view of a wafer which has been severed along line A—A from the extruded dough of FIGURE 1.

In the present embodiment the hole or opening 16 in the pellet 10 of FIGURE 5 provides a controlling effect upon the finished product. In order to form the hole or opening 16 in the pellet 10, the dough flow controlling member 22 is provided with a vertically extending stem or projection 38. The pin 38 projects through the center of the opening 32 in the orifice plate 20 and separates the dough 15 as it is passing through the die 20 thus forming the hole or opening 16. As will be noted in FIGURE 2, the pin 38 decreases the central portion of the opening 32 to such an extent that the annular area surrounding the pin 38 in the opening 32 is substantially the width of the openings 34. Thus when the dough 15 is extruded through the dough flow controlling member 22 and the orifice plate 20, it flows through the opening 32 at a substantially uniform rate and meets with an equal amount of resistance at all points.

The dough flow controlling member 22 and the orifice plate 20 are maintained in operative juxtaposition relative to the cylinder 18 by a plurality of set screws 29. A piston 30 located in the upper portion of the cylinder 18 is used to force the cooked dough 15 downwardly around the dough flow controlling member 22 and through the orifice plate 20 so that by reason of the aperture 32 the dough is extruded through orifice plate 20 and emerges in the form of strand 12.

As the strand 12 leaves the extrusion apparatus 11, it is sliced at the orifice plate into relatively thin wafers. One of these relatively thin wafers has been indicated by the reference numeral 10 and can be viewed in FIGURE 5. As seen from this particular figure, the cross-sectional view of said strand 12 is closely related to the shape of the aperture 32.

Figure 6:
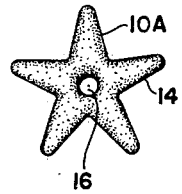
FIGURE 6 is a plan view of the puffed cereal product produced from the wafer of FIGURE 5.
Figure 8:
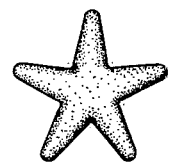
FIGURE 8 is a plan view of the puffed cereal product produced from the wafer of FIGURE 7.

After slicing the strand 12 into the wafers 10, the wafers are puffed by subjecting them to sufficient radiant heat, fat frying, vacuum puffing or the like. One of these puffed wafers has been indicated by reference numeral 10-A and can be viewed in FIGURE 6. It will be noted that upon puffing the radially extending arms 14 are stretched more at their point of attachment to the central base section of the wafer than at their unattached ends, thereby forming a readily distinguishable star-shaped product.

The dough from which the star-shaped product of the instant invention is produced may be any of a number of cereal doughs which are derived from cereals such as wheat, corn, oats, barley, rye; vegetable flours and starches such as potatoes and the like; or any combination of the above-mentioned substances. The dough may also be handled in an uncooked condition or cooked in any conventional manner such as that shown in the Collatz Patent 2,162,376. While the present invention is particularly applicable to cooked cereal doughs in general, particular reference will be made to the employment of a wheat dough in order to fully illustrate the invention. Also to be pointed out is the fact that other doughs can be utilized and that adjustments may be desirable, particularly with reference to their moisture content and the relative proportions of ingredients. Such variations, however, can readily be arrived at from a consideration of the following example which is presented for illustration.

*Example I*

A dough was prepared from the following ingredients:

| | |
|---|---|
| Michigan white wheat (ground in a hammermill equipped with 0.185 inch diameter round hole screen) grams | 570 |
| Yellow corn cones do | 570 |
| Sucrose do | 125 |
| Salt do | 25 |
| Water cc | 900 |

Figure 7:
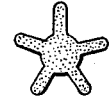
FIGURE 7 is a plan view of a wafer which has been severed along line A'—A' from the extruded dough of FIGURE 4.

The above dough was cooked in a small double arm jacketed mixer at approximately atmospheric pressure and at a temperature of 212° F. for approximately two hours with reflux, 20 minutes with vent open and 28 minutes with the top removed. The cooked dough had a moisture content of approximately 25% and was quite suitable for extrusion in the device illustrated in FIGURE 1 for producing the resultant cereal products of FIGURES 5 and 7.

Referring now to the extrusion of the dough through the apparatus 11 of FIGURE 1. A suitable amount of the dough was extruded through the above-mentioned device and the resultant strand and then sliced into thin wafers of about 0.040 inch thickness. The wafer shown in FIGURE 5 is illustrative of the wafers severed from the strand produced in the device of FIGURE 1. These wafers were then puffed in a conventional puffing gun to yield puffed products resembling those illustrated in FIGURE 6.

Figure 4:
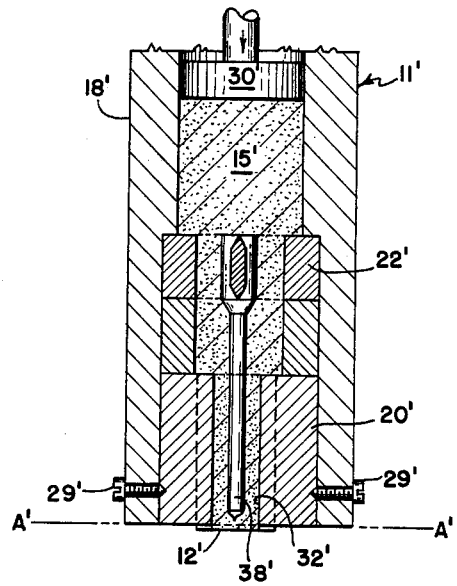
FIGURE 4 is an elevational view in section of an alternative extrusion apparatus similar to the device of FIGURE 1 for producing the unpuffed cereal product disclosed in FIGURE 7.

While for purposes of illustration I have described the preparation of a star-shaped cereal product having a central aperture, it will be readily apparent to those skilled in the art that it is not essential that control over the central portion of the wafer be exercised to this extent. For example, a star-shaped cereal product which does not have a central aperture may be prepared by extruding the dough through an extrusion apparatus similar to that of FIGURES 4, 2 and 3 which possesses a dough directing projection pin 38′ which is positioned essentially as previously described, except that the unattached end (lower end in the drawing) is located so it extends only far enough down into the orifice of the orifice plate 20′ so that it controls the flow of the dough and prevents the formation of an enlarged central mass while still allowing a solid strand to be extruded. This strand is then preferably cut at the orifice plate to form a thin wafer of uniform thickness, which is then puffed by conventional methods such as gun puffing and the like to form a star-shaped cereal product.

The desirability of the cereal products obtained by exercise of the present invention may, of course, be further enhanced by coloring the cereal products or coating or dusting said cereal products with flavoring substances such as salt, sugar, cocoa, spices and the like, as well as by other procedures well known to those skilled in the art.

Now, therefore, I claim:

1. A method of preparing a star-shaped cereal product which comprises the steps of producing a dough having sufficient moisture content therein for extrusion, extruding said dough into a strand having a central portion with connecting radially extending arms of substantially uniform width throughout, the unattached ends of said radially extending arms forming the points of a star, slicing said strand into thin wafers and then puffing said wafers to form a star-shaped cereal product, the arms becoming divergent toward their base during the puffing operation by reason of the expansion of the central portion of said wafer.

2. The method of claim 1, wherein the cereal product is pressure puffed to form a star-shaped cereal product.

3. The method of claim 1, wherein the cereal product is puffed by radiant heat to form a star-shaped cereal product.

4. The method of claim 1, wherein the cereal product is puffed by fat frying to form a star-shaped cereal product.

5. In a method of preparing a star-shaped cereal product which involves extruding a cereal dough into a strand, slicing said strand into thin wafers and subsequently puffing said wafers to form the star-shaped product the improvement which comprises extruding said cereal dough into a strand having a central portion with connecting radially extending arms of substantially uniform width throughout.

6. In a method as defined in claim 5 in which said central portion is an annulus having a width substantially equal to the width of said arms.

References Cited in the file of this patent

UNITED STATES PATENTS

| | | |
|---|---|---|
| 2,162,376 | Collatz | June 13, 1939 |
| 2,615,809 | Jean | Oct. 28, 1952 |
| 2,701,200 | Huber | Feb. 1, 1955 |

OTHER REFERENCES

"Betty Crocker's Picture Cook Book," 2nd edition, 1956, published by McGraw-Hill Book Co., Inc. (New York), page 217.